(12) United States Patent
Mitani et al.

(10) Patent No.: US 7,623,527 B2
(45) Date of Patent: Nov. 24, 2009

(54) METHOD FOR ANALYZING NETWORK TRACE, METHOD FOR JUDGING ORDER AMONG NODES, PROCESSOR FOR ANALYZING NETWORK TRACE, COMPUTER-EXECUTABLE PROGRAM FOR CONTROLLING COMPUTER AS PROCESSOR, AND METHOD FOR CORRECTING TIME DIFFERENCE AMONG NODES IN NETWORK

(75) Inventors: Masako Mitani, Yokohama (JP); Yukio Miura, Fujisawa (JP); Yukinobu Moriya, Tokyo-to (JP); Hiroyuki Wada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 10/879,600

(22) Filed: Jun. 29, 2004

(65) Prior Publication Data

US 2005/0018694 A1     Jan. 27, 2005

(30) Foreign Application Priority Data

Jul. 4, 2003     (JP) .............................. 2003-270958

(51) Int. Cl.
*H04L 12/28* (2006.01)
(52) U.S. Cl. ...................... 370/396; 370/248; 709/224
(58) Field of Classification Search ................. 370/396, 370/229, 241, 252; 709/224; 706/19
See application file for complete search history.

(56) References Cited

U.S. PATENT DOCUMENTS

| | | | | |
|---|---|---|---|---|
| 5,086,428 A | * | 2/1992 | Perlman et al. | 370/394 |
| 5,533,168 A | * | 7/1996 | Abe et al. | 706/19 |
| 6,519,248 B1 | * | 2/2003 | Valko | 370/352 |
| 6,976,087 B1 | * | 12/2005 | Westfall et al. | 709/238 |
| 7,016,351 B1 | * | 3/2006 | Farinacci et al. | 370/392 |
| 2001/0014089 A1 | * | 8/2001 | Okajima et al. | 370/338 |
| 2001/0050903 A1 | * | 12/2001 | Vanlint | 370/252 |
| 2002/0105911 A1 | * | 8/2002 | Pruthi et al. | 370/241 |
| 2002/0196802 A1 | * | 12/2002 | Sakov et al. | 370/432 |
| 2003/0023716 A1 | * | 1/2003 | Loyd | 709/224 |

FOREIGN PATENT DOCUMENTS

| | | |
|---|---|---|
| JP | 62-213458 | 9/1987 |
| JP | 06-205047 | 7/1994 |

\* cited by examiner

*Primary Examiner*—Michael J Moore, Jr.
*Assistant Examiner*—Lonnie Sweet
(74) *Attorney, Agent, or Firm*—Jason O. Piché

(57) ABSTRACT

A processor and program for analyzing network trace with the use of data packets transmitted via a network includes: a memory section 32 for storing trace data generated from the data packets; a packet analyzing section 34 for retrieving a pair of packets belonging to the same session from the trace data to generate an order relation between nodes; an array data generating section 36 for using packet pair data and order relation data to generate and store array data used for estimating time difference of the specific time axis of each node; and a solution engine section 38 for calculating an estimated value of the time difference with the use of the array data to store the estimated value in a memory.

10 Claims, 12 Drawing Sheets

```
main()
{
    READS TRACE DATA

RETRIEVES DATA PACKETS BELONGING TO THE SAME
    SESSION TO GENERATE AN ORDER RELATION AMONG NODES for (g=0; g<THE NUMBER OF NODES; g++){
        DETERMINES THE MINIMUM VALUE FOR TIME REQUIRED FOR DATA
        PACKET IN DIRECTION OF g→g+1, AND
        THE MAXIMUM VALUE FOR TIME REQUIRED FOR DATA PACKET IN
        DIRECTION OF g+1→g,
        BETWEEN g-TH POINT AND (g+1)TH POINT
    }

CONVERTS DATA OF THE FOLLOWING SIMULTANEOUS
    INEQUALITIES INTO ARRAY DATA FORMAT AND STORES IT IN MEMORY:
```

$$\max(t'_{1k}-t'_{0k}) < x_1 < \min(t_{1m}-t_{0m})$$

$$\max(t'_{(g+1)h}-t'_{gh}) < x_{g+1} - x_g < \min(t_{(g+1)i}-t_{gi}).$$

```
    CALLS SOLUTION ENGINE TO SOLVE SIMULTANEOUS
    INEQUALITIES BY NUMERAL ANALYSIS AND DETERMINES
    TIME DIFFERENCE x_g AT EACH POSITION IN A MANNER
    THAT CONSTRAINT CONDITION IS SATISFIED

DETERMINES QUANTITY OF TIME CORRECTION FROM WITHIN
    ALLOWABLE RANGE OF TIME DIFFERENCE x_g
}
```

FIGURE 7

METHOD FOR ANALYZING NETWORK TRACE, METHOD FOR JUDGING ORDER AMONG NODES, PROCESSOR FOR ANALYZING NETWORK TRACE, COMPUTER-EXECUTABLE PROGRAM FOR CONTROLLING COMPUTER AS PROCESSOR, AND METHOD FOR CORRECTING TIME DIFFERENCE AMONG NODES IN NETWORK

BACKGROUND DESCRIPTION OF THE INVENTION

1. Field of the Invention

The present invention relates to a technique for analyzing network trace at apparatuses mutually connected on a network, and in particular to a method for analyzing network trace, a method for judging an order among multiple apparatuses connected to multiple networks (hereinafter referred to as nodes), a processor for analyzing network trace, a computer-executable program for controlling a computer as a processor, and a method for correcting time difference among nodes in a network, for correcting time difference among built-in clocks in nodes connected to a network with the use of network trace acquired at multiple nodes.

2. Background Art

Modern network systems, to which various equipment is connected, have a physically and logically complicated structure. In order to solve a trouble caused in such a system, it is necessary to acquire data packets at multiple locations on the network, store them after adding time stamps thereto, and then analyze them. However, clocks built in equipment for acquiring network trace are usually not synchronized, and therefore it is necessary to correct time stamps added to data packets when comparing and analyzing data acquired at multiple locations.

Traditionally, the above-mentioned correction has been performed by determining the quantity of time correction estimated based on the experience of a service engineer and by inputting the corrected time quantity for each node. Therefore, there have been caused inconveniences that the time correction work for a network, significantly depending on the workmanship of a service engineer and giving much burden on the service engineer, is not efficient, that there may be a case where an effect of correction cannot be sufficiently assured, that burden on a user or a service engineer in his work is also increased, and the like.

Problems To Be Solved By The Invention

To solve the above-mentioned inconveniences, the inventor et. al proposed, in Published Unexamined Patent Application No. 2002-111782, a network trace acquisition apparatus (hereinafter referred to as an agent device in the present invention) for acquiring network trace at multiple nodes on a network and storing data packets identified for each node.

Patent Document 1
Published Unexamined Patent Application No. 2002-111782

The above-mentioned agent device acquires data packets at multiple nodes on a network and stores the data packets for each node for measurement. The stored data is read by a computer when a service engineer, for example, brings it back to a service site for the service engineer to analyze it. In this manner, it is possible to improve efficiency of analysis of network trace by devising a graphical user interface (GUI) for displaying network trace for multiple nodes. However, if a service engineer specifies the quantity of time correction with the use of his advanced knowledge each time, the quantity of time correction significantly depends on the service engineer's experience and workmanship, and it cannot be assured whether the accuracy is satisfying or not. Therefore, it may be required to repeat try-and-error corrections by re-estimating the quantity of time correction and bringing it back to the field.

There have been known various network trace analysis methods. However, it has been required to provide the quantity of time correction with high efficiency by analytically and automatically estimating it for a node connected to a route in a network with the use of actually measured data and to give the quantity of time correction based on an objective measure while reducing degree of dependence on workmanship of a service engineer and burden on a user.

Furthermore, it has been required to enable execution of an apparatus capable of automatically judging an order relation in a transaction of packets from data packets transmitted on a network to generate a preferable method for acquiring the quantity of time correction.

SUMMARY OF THE INVENTION

The present invention has been made in consideration of the above-mentioned inconveniences of the prior-art methods. The present invention has been made based on the following idea: if, with the use of trace data measured at multiple nodes on a network, an order relation along a transaction direction of data packets among the nodes can be established, then efficient and objective estimation of the quantity of time correction can be performed with the use of a numerically analytic method.

In the present invention, a pair of packets belonging to a single session, for example, a request/response pair, is retrieved from data packets acquired for each node to utilize the fact that difference between time stamps of the pair of packets, which are supplied when the pair of packets pass predetermined nodes, gives an order of the nodes along a transaction direction. When an order relation is given for a predetermined pair of packets, simultaneous linear inequalities can be given with time difference as a variable. The simultaneous linear inequalities are numerically analyzed to calculate an allowable range of the time difference under a predetermined constraint condition. By determining the quantity of time correction from within the calculated allowable range and setting the value for each node, time correction for the network can be achieved.

That is, according to the present invention, there is provided a method for analyzing network trace for a network on which multiple nodes are connected, the method comprising:

causing a processor to read data packets transmitted via the network from a recording medium that stores the data packets, as trace data associated with each node;

causing the processor to store the read trace data therein;

retrieving a pair of packets belonging to the same session from the stored trace data and determining an order relation along a transaction direction among the nodes; and determining time difference of specific time axes of the nodes based on the order relation along a transaction direction among the nodes and data of the pair of packets.

In the present invention, determining time difference comprises: creating array data satisfying a constraint condition for the time difference of the specific time axis of each node to store the array data in a memory; and determining multiple time differences satisfying the constraint condition with the use of the array data to store the time differences in a storage device. The array data may be a coefficient matrix for simultaneous linear inequalities with the time difference included therein as a variable. Determining an order relation can comprise judging which is the larger of differences between time stamps given when the pair of packets pass two adjoining nodes to judge an order relation between the nodes.

According to the present invention, there is provided a method for judging an order relation along a transaction direction of data packets among nodes connected to a network; the method comprising:

causing a processor to read trace data that is data packets acquired from a network and stored in association with the nodes;

retrieving a pair of packets belonging to the same session from the trace data read by the processor to store the pair of packets in a memory;

reading time stamps given when the pair of packets pass a predetermined node to cause time stamp difference to be calculated; and comparing the time stamp differences caused when the pair of packets pass different nodes.

In the present invention, there can be further included generating an order relation among the nodes existing on the network from the trace data, based on the comparison of the time stamp differences of the pair of packets. In the present invention, there can be further included assigning a node at which the time difference is larger on the upstream of transaction and a node at which the time difference is smaller on the downstream of transaction, in response to the comparison of the time stamp differences.

In the present invention, there is provided a processor for analyzing network trace with the use of data packets transmitted via a network; the processor comprising:

a memory section for storing trace data generated from the data packets;

a packet analyzing section for retrieving a pair of packets belonging to the same session from the trace data to generate an order relation between nodes;

an array data generating section for using packet pair data and order relation data to generate and store array data used for estimating time difference of the specific time axis of each node; and a solution engine section for calculating an estimated value of the time difference with the use of the array data to store the estimated value in a memory.

The array data may be a coefficient matrix of simultaneous linear inequalities with the time difference included therein as a variable. The packet analyzing section may include means for judging which is the larger of differences between time stamps given when the pair of packets pass two adjoining nodes to judge an order relation relative to a transaction direction between the nodes.

According to the present invention, there can be provided a computer-executable program for controlling a computer as a processor for analyzing network trace for a network to which multiple nodes are connected; the program causing the computer to execute steps of:

causing data packets to be read from a recording medium that stores the data packets transmitted via the network, as trace data associated with each node;

causing the read trace data to be stored;

retrieving a pair of packets belonging to the same session from the stored trace data and determining an order relation along a transaction direction between the nodes; and determining time difference of specific time axes of the nodes based on data of the order relation along a transaction direction among the nodes and data of the pair of packets.

The program can further cause the computer to execute:

creating array data satisfying a constraint condition for the time difference of the specific time axis of each node to store the array data in a memory; and determining multiple time differences satisfying the constraint condition with the use of the array data to store the time differences in a storage device. The program can cause the computer to execute:

judging which is the larger of differences between time stamps given when the pair of packets pass two adjoining nodes to judge an order relation between the nodes.

According to the present invention, there can be provided a computer-executable program for judging an order relation along a transaction direction of data packets among nodes connected to a network to cause a computer to execute analysis of network trace; the program causing the computer to execute:

causing a processor to read trace data that is the data packets acquired from the network and stored in association with the nodes;

retrieving a pair of packets belonging to the same session from the read trace data to store the pair of packets in a memory; reading time stamps given when the pair of packets pass a predetermined node to cause time stamp difference to be calculated;

comparing the time stamp differences caused when the pair of packets pass different nodes; and generating an order relation among the nodes existing on the network from the trace data, based on the comparison of the time stamp differences of the pair of packets. In the present invention, it is possible to cause the computer to execute assigning a node at which the time difference is larger on the upstream of transaction and a node at which the time difference is smaller on the downstream of transaction, in response to the comparison of the time stamp differences.

According to the present invention, there can be provided a time difference correction method for correcting difference of specific time axes of nodes connected to a network; the method comprising:

measuring data packets transmitted via the network for each node to acquire trace data;

using a processor to acquire an order relation in a transaction among the nodes from the trace data;

using the processor to estimate an allowable range of time difference of the specific time axes based on numerical analysis, with the use of data of the order relation among nodes and packet pair data; and selecting a time correction value from within the allowable range.

In the present invention the time difference correction method can comprise causing the processor to judge which is the larger of differences between time stamps given when the pair of packets pass two adjoining nodes.

BRIEF DESCRIPTION OF THE DRAWINGS

FIG. 7 shows a schematic pseudo-code of a program which can be implemented in a processor for processing for obtaining a specific time difference $x_g$ of the present invention;

DETAILED DESCRIPTION OF AN EMBODIMENT OF THE INVENTION

The present invention will be described with specific embodiments shown in figures below. However, the present invention is not limited to the embodiments shown in the figures.

Figure 1:
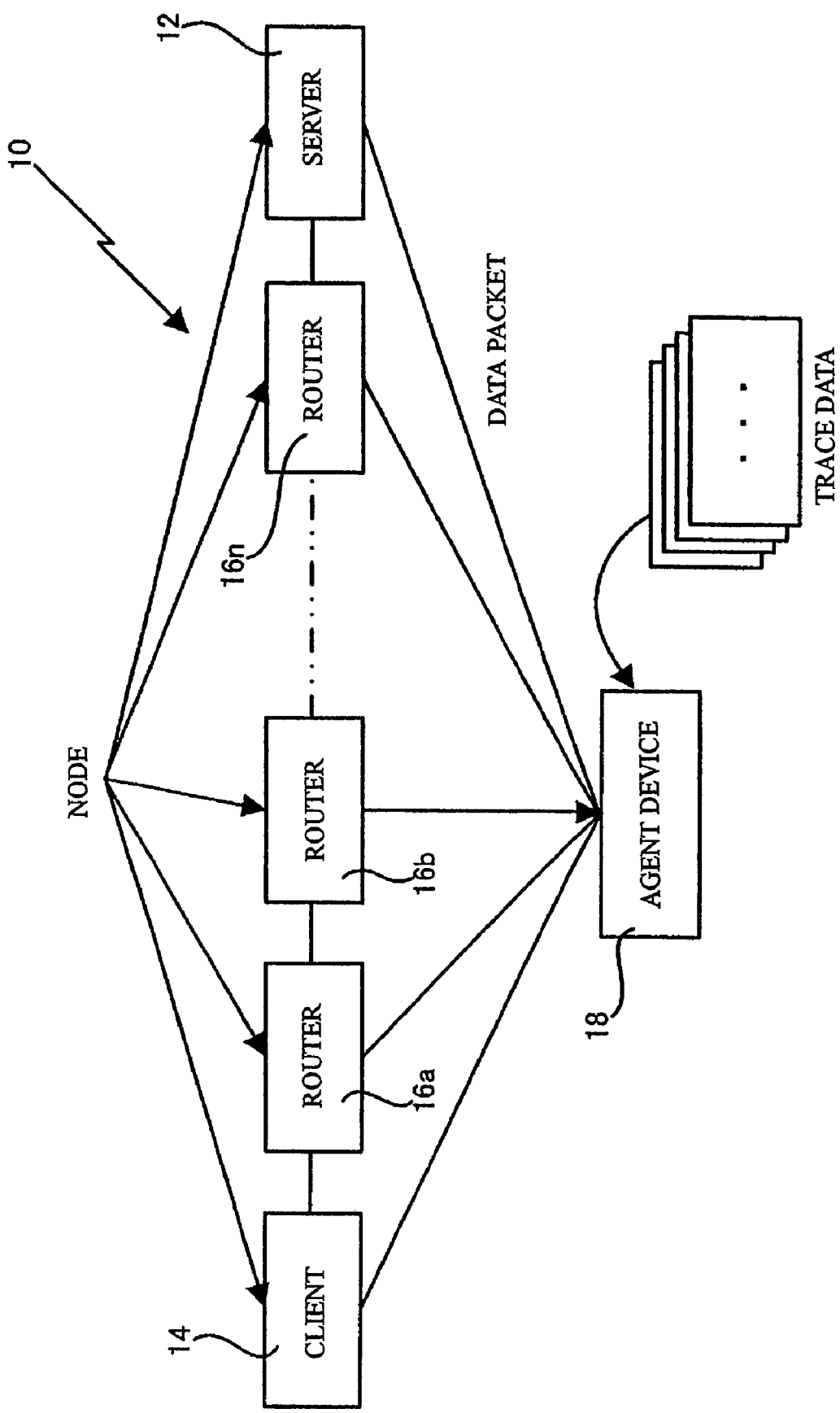
FIG. 1 is a schematic block diagram of a network system 10 to which the present invention is applied.

Section I. Prediction method based on numerical analysis of node-specific time axis FIG. 1 shows a schematic block diagram of a network system 10 to which the present invention is applied. The network system 10 includes a server 12, a client 14, and multiple routers 16a to 16n for routing between the server 12 and the client 14. In the embodiment shown in FIG. 1, the client 14 is connected to the router 16a and performs data transmission with the server 12, and other clients and servers (not shown) connected via the multiple routers 16a to 16n.

In the present invention, the client 14 can be configured with a computer such as a personal computer and a workstation. The server 12 can be also configured, for example, with a personal computer or a workstation. When seen from a functional viewpoint, a printer server, a file server and the like are sited as examples. Furthermore, in the present invention, the server 12 can be configured as an appliance server dedicated for a particular purpose. In the present invention, it is possible to arrange multiple servers 12 in the network system 10 as required. The embodiment shown in FIG. 1 shows that an agent device 18 collects data packets on nodes on a network, such as the client 14, the server 12, the routers 16a to 16n.

In collection of data packets, it is possible to connect the agent device 18 to each node sequentially for measurement, and it is also possible to connect the agent device directly to a node or the network itself for measurement. Furthermore, it is also possible to use multiple agent devices for measurement and integrate measurement results as data for each node or network in a processor described later. The agent device is generally configured separately from the processor described later, and trace data can be stored in a suitable recording medium.

Figure 2:
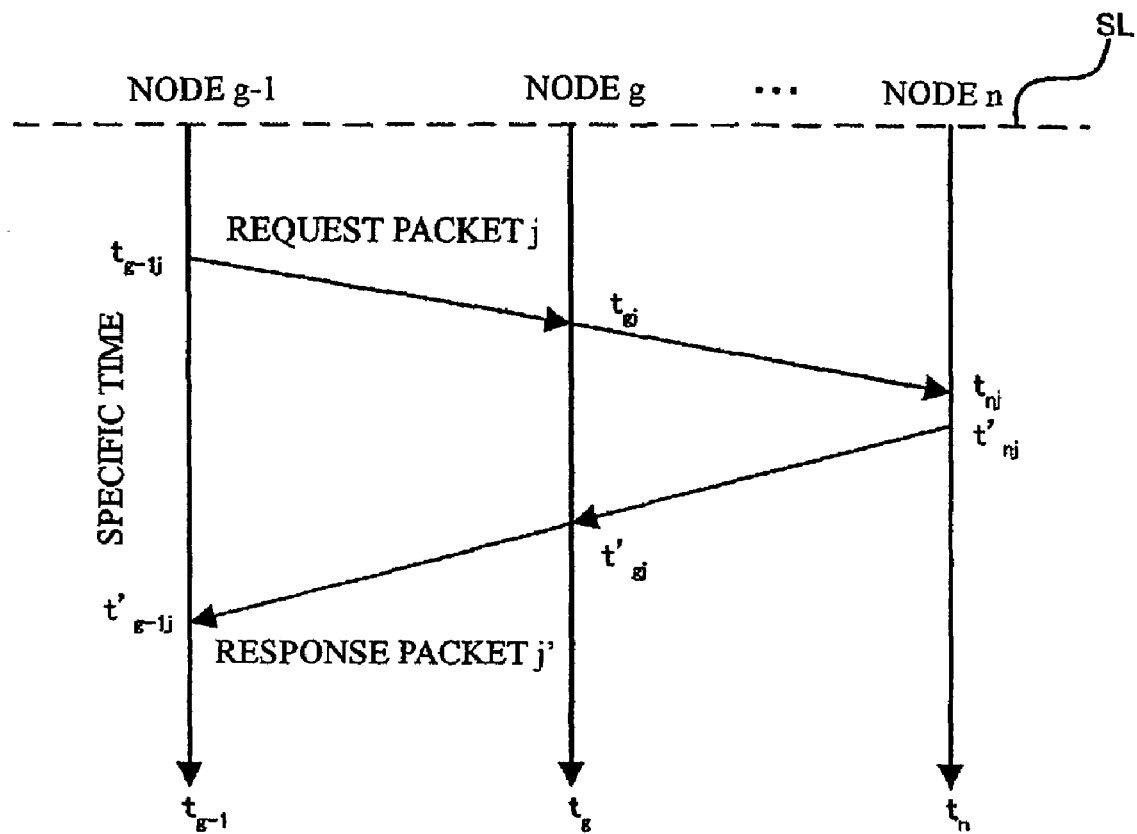
FIG. 2 shows an ideal time chart for data packets transmitted via the network shown in FIG. 1.

FIG. 2 shows an ideal time chart for data packets transmitted via the network shown in FIG. 1. In the present invention, the term "ideal" means that internal clocks of apparatuses connected to a network are completely synchronized. The time chart for transaction of data packets shown in FIG. 2 shows the time when each packet passes each node on a network, in an embodiment wherein the client 14 sends to the server 12 a request packet for requesting an application, the request packet is transmitted via nodes such as a router, and the server 12 sends a response packet in response to the request, for example.

In the time chart shown in FIG. 2, the vertical axis indicates elapse of time. The time chart comprises specific time axes $t_{g-1}$, $t_g$ and $t_n$, each of which is associated with an internal clock synchronized with each node on the network 10. In the time chart shown in FIG. 2, since the specific time axes $t_{g-1}$, $t_g$ and $t_n$ are completely synchronized, the positions of time "0" for all the specific time axes are aligned on a reference line SL shown on the upper part of FIG. 2.

In FIG. 2, it is indicated that a request packet j passes a node (g−1) at a specific time $t_{g-1j}$, a node g at a specific time $t_{gj}$, and then a node (g+1) at a specific time $t_{nj}$. Data packets are stored in the agent device 18 used in the present invention with a time stamp given when they pass each node. In FIG. 2, description is made on the assumption that the nodes are routers. However, it is not intended to limit the nodes to routers, and any apparatus arranged on a route on a network can be selected as a node.

In the ideal case shown in FIG. 2, there is no time advance or delay caused on the specific time axes, and therefore the relation of the time stamps given when respective nodes were passed can be shown as $t_{nj} > t_{gj} > t_{g-1j}$ in the order from the latest to the oldest time when the node was passed. The same is true on a response packet j', and the relation of the specific times when respective nodes are passed can be shown as $t'_{gj} > t'_{g-1j} > t'_{nj}$. In this case, since no inconsistency of the time stamps is caused, no inconvenience is caused, either.

Figure 3:
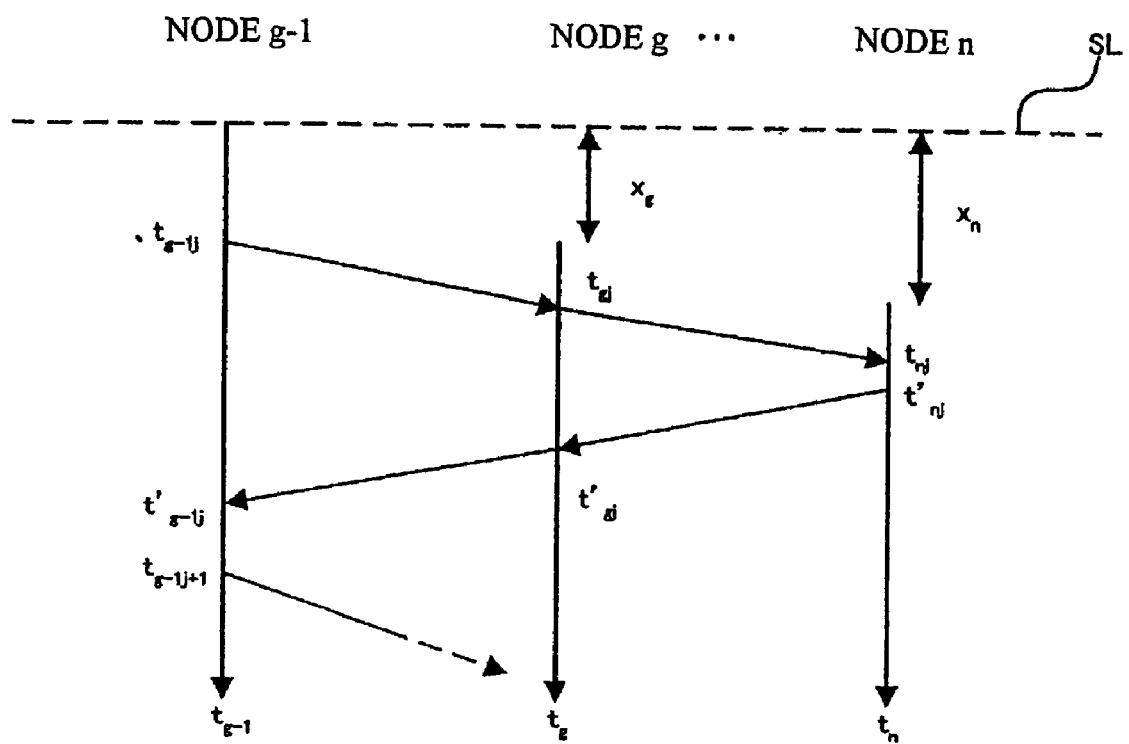
FIG. 3 shows a time chart in an actual network system, where the specific time axes $t_{g-1}$, $t_g$ and $t_n$ of nodes are displaced from one another.

In contrast to this, FIG. 3 shows a time chart in an actual network system 10, where the specific time axes $t_{g-1}$, $t_g$ and $t_n$ of nodes are displaced from one another. In the embodiment shown in FIG. 3, a time delay $x_g$ is caused on the specific time axis $t_g$, and time delay $x_n$ on the specific time axis $t_n$, when considering the time axis $t_{g-1}$ to be a reference. In such a case, time stamps given on each specific time axis do not necessarily correspond to the order on a transmission route, which complicates analysis of network trace. Furthermore, it may possibly cause a failure on the network system 10.

Hereinafter, the time stamp given to the j-th data packet at the node g is indicated by $t_{gj}$, and the time stamp of the node 8 given to a packet j' belonging to the same session as the j-th data packet is indicated by $t'_{gj}$ at these specific times. The $x_1$ to $x_n$ is referred to as time differences among the specific time axes. In this invention, description will be made on the assumption that a positive value of x indicates time advance of a time axis and a negative value of x indicates time delay of a time axis.

FIG. 3 will be now described in detail. The data packets j and j' are transmitted through the network at predetermined transmission speeds, and therefore the actual data packet j reaches another node with a time delay depending on the transmission length of the network route. Similarly, in the case of the data packet j' belonging to the same session as the data packet j, a time delay is caused depending on the transmission length.

By the way, in most cases, specific time axes cannot be expected to be synchronized as described above, and time differences $x_1$ to $x_n$ are caused on each of the specific time axes. This causes an inconvenience that it is not possible to compare, among respective nodes, time stamps given when the respective nodes are passed, even if the data packets j and j' are delayed in a chronological order depending on transmission lengths. Specifically, when the time difference is large, at a destination node of a data packet, an older value than the time stamp given to the sending node or a future value is given. Therefore, it is necessary to prevent inconsistency from being caused among time stamps by performing time correction for each node. In the present invention, to "prevent inconsistency from being caused among time stamps" specifically means to prevent a time stamp at each node from being delayed in time relative to a time stamp given at a node passed by a data packet later than a time stamp of a predetermined node previously passed by the data packet.

Figure 4:
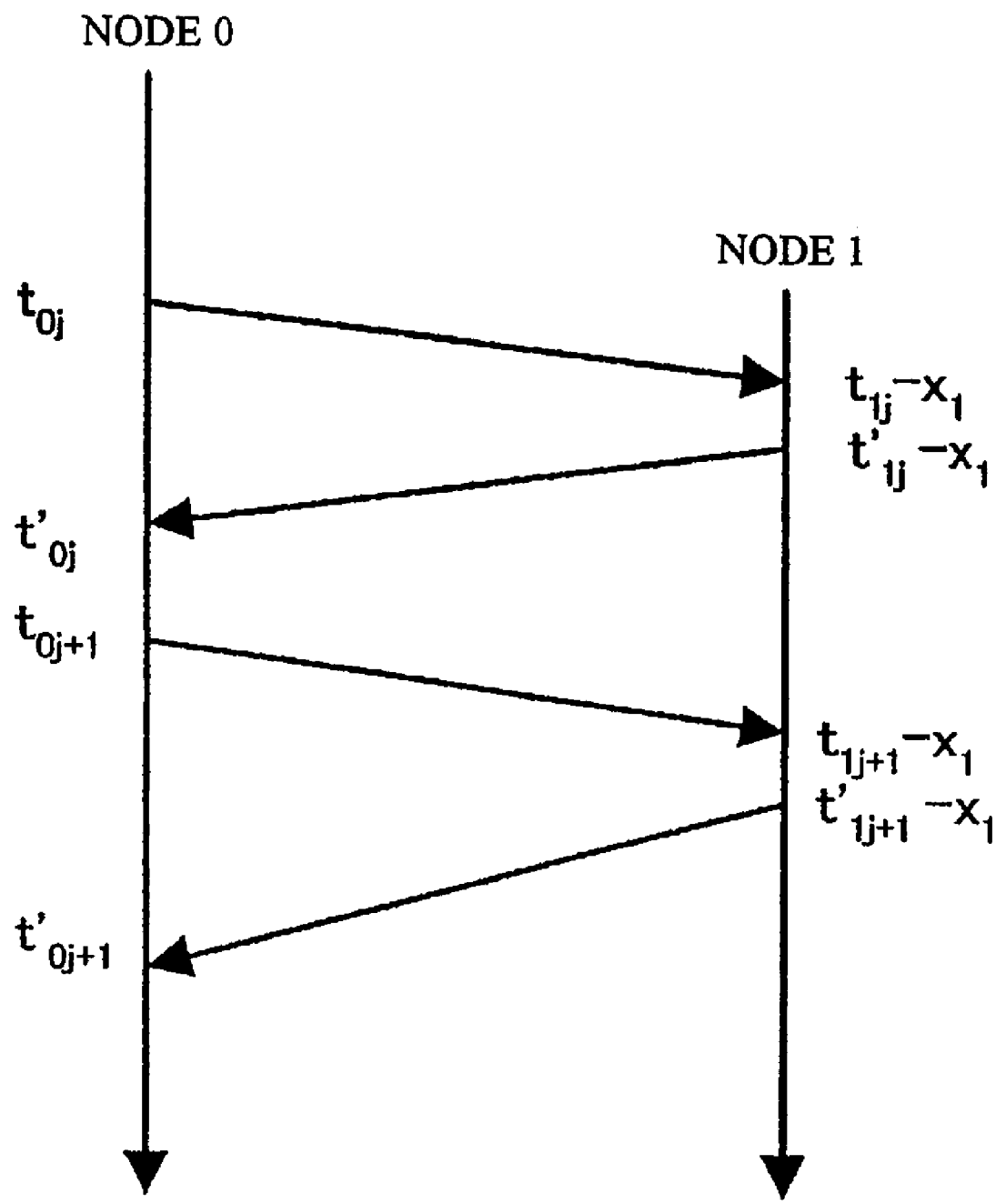
FIG. 4 shows a constraint condition for the case where data packets 1 to j are transmitted between a node 0 and a node 1.

More specifically, in the present invention, an allowable range of the quantity of time correction is acquired by numerical analysis by including the above-mentioned constraint condition in the numerical analysis of network trace. FIG. 4 shows the above-mentioned constraint condition for the case where data packets 1 to j are transmitted between a node 0 and a node 1. Description will be made on the assumption that the nodes 0 and 1 may be any apparatus connected to the network system 10, and that the node 0 means a node used as a reference for time correction and the time stamp thereof is 0, in FIG. 4.

As shown in FIG. 4, the data packets j and j+1 sent from the node 0 reach the node 1 at a time with a predetermined delay, and a time stamp with the time difference $x_1$ is attached thereto. The data packets j and j+1 then reach another node, and returned to the node 0 via the node 1 from the another node, for example, as packets j' and j+1'. If it is assumed that the time difference between the node 0 and the node 1 does not significantly change during collection of data packets, the following simultaneous inequalities can be given under the above-described constraint condition that "inconsistency should be prevented from being caused among time stamps".

Mathematical expression 1 (1)

$$t_{0j} < t_{1j} - x_1 \qquad t'_{0j} > t'_{1j} - x_1$$
$$t_{0j+1} < t_{1j+1} - x_1 \qquad t'_{0j+1} > t'_{1j+1} - x_1$$
$$\vdots \qquad \qquad \vdots$$

When rewriting the above inequalities (1) for the specific time difference $x_1$, the following expressions (2) can be obtained.

Mathematical expression 2 (2)

$$x_1 < t_{1j} - t_{0j} \qquad x_1 > t'_{1j} - t'_{0j}$$
$$x_1 < t_{1j+1} - t_{0j+1} \qquad x_1 > t'_{1j+1} - t'_{0j+1}$$
$$\vdots \qquad \qquad \vdots$$

By comparing both sides of the above expressions (2), the specific time difference $x_1$ must be smaller than the minimum value of time difference for a packet headed from the node 0 to the node 1 and at the same time larger than the maximum value of time difference for a packet headed from the node 1 to the node 0, in order to satisfy the above expressions (2) for all the data packets. Therefore, the time difference $x_1$ is required to satisfy the following expression (3), where the identification value of a data packet which has been given the minimum value is indicated by k, and the identification value of a data packet which has been given the maximum value is indicated by m.

Mathematical Expression 3

$$\max(t'_{1k}-t'_{0k}) < x_1 < \min(t_{1m}-t_{0m}) \qquad (3)$$

The same relation is obtained between nodes other than between the node 0 and the node 1, and this can be generally expressed as the following simultaneous inequalities (4).

Mathematical Expression 4

$$\max(t'_{(g+1)h}-t'_{gh}) < x_{g+1}-x_g < \min(t_{(g+1)i}-t_{gi}) \qquad (4)$$

where "g (g=1, 2, ..., n−1)" indicates the g-th node; "h" is a packet identification value indicating a data packet to be given the maximum-value time difference; and "i" is a packet identification value indicating a data packet to be given the minimum-value time difference. Thus, if the correction quantity of specific time for each node g is specified within the range that allows the above-mentioned simultaneous inequalities to be satisfied (hereinafter referred to as an allowable range), the above-mentioned constraint condition can be satisfied.

It is easy to generate simultaneous inequalities when the transmission direction of a data packet can be graphically specified as in FIGS. 2 to 4. However, in the case of a data packet to be measured by an agent device, information on a node is a time stamp in which a lag of a specific time is included. Therefore, an order relation among nodes, related to a transaction cannot be judged with the use of a time stamp as it is. To cope with this problem, it is conceivable to use a packet including an identification code and the like, which is different from other data packets, to perform trace. However, in the present invention, it has been found that the quantity of correction can be estimated more efficiently by causing the above-mentioned process of judging an order relation in a transaction direction among nodes to be automatically executed only with the use of trace data collected by an agent device.

Description will be now made on the process of obtaining an order relation in a transaction direction among nodes in the present invention.

Section II. Retrieval of a Pair of Packets Belonging to the Same Session and Generation of an Order Relation in a Transaction Direction Among Nodes.

Figure 5:
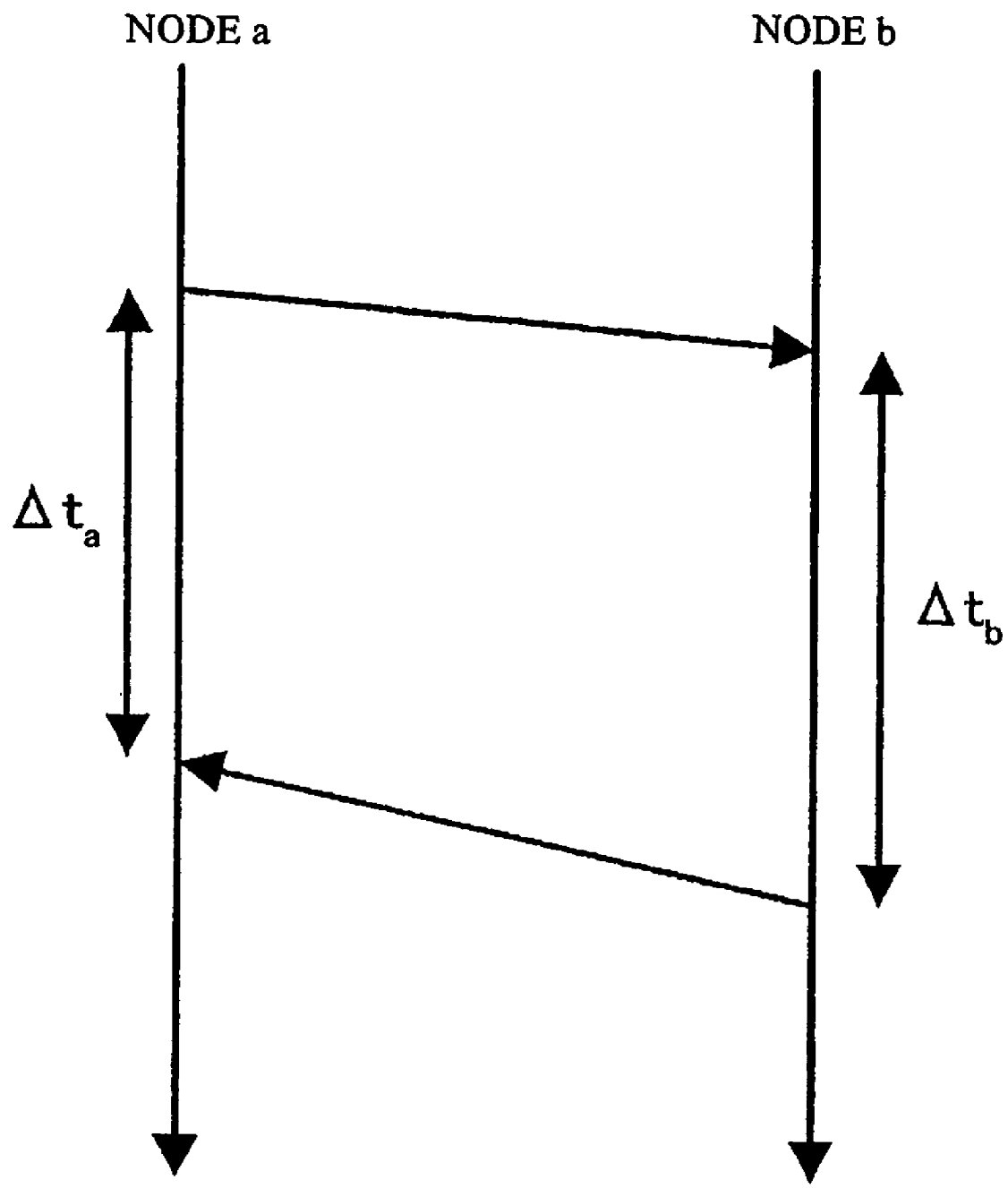
FIG. 5 shows a basic method for identifying a pair of packets from a group of data packets acquired according to the present invention.

FIG. 5 shows a basic method for identifying a pair of packets from a group of data packets acquired according to the present invention. The inventor et al. have focused attention on the fact that time stamps, which are given to data packets belonging to the same session when they pass nodes a and b within a network, can be used for the above-described sequencing of nodes. That is, the inventor et al. compare differences $Dt_a$ and $Dt_b$ between time stamps at a node near a sending node. Specific description will be now made with the use of FIG. 5. The time stamp difference $Dt_b$ between a pair of data packets belonging to the same session, at the node near the sending node is always larger by the length of transmission time required for the transmission length between the nodes. This judging method uses only the interval between specific time axes for judgment and therefore is not dependent on time difference on specific time axes.

The session of data packets can be determined with the use of an identifier for session management which is specified by each protocol, for example, a syn/ack identifier in the case of TCP. Accordingly, in the present invention, a pair of packets belonging to the same session is identified with the use of an identifier included in collected trace data first. After that, by calculating difference between time stamps given when the pair of packets pass a predetermined node, the time stamp difference $Dt_g$ at a first node can be obtained.

Figure 6:
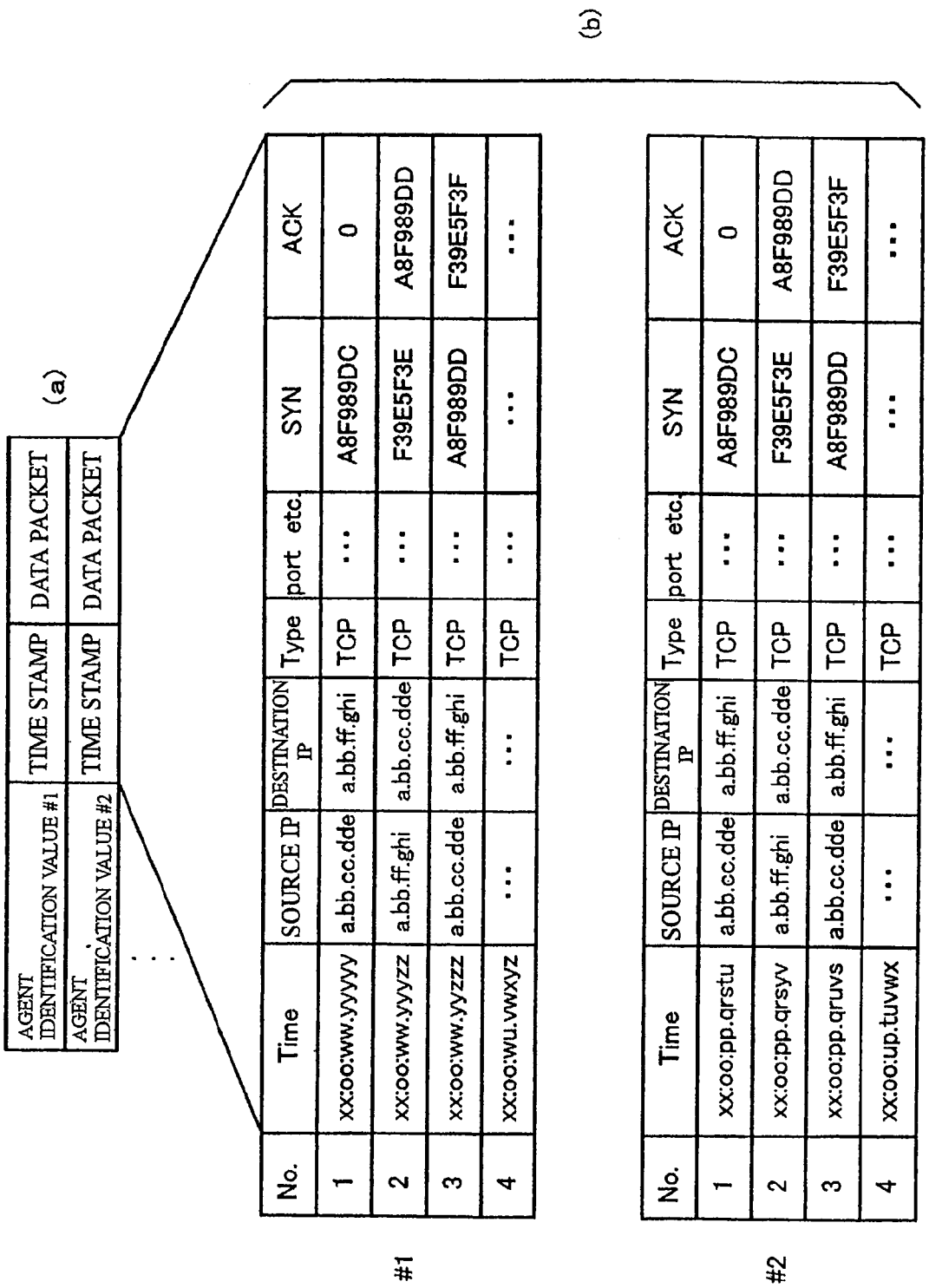
FIG. 6 shows an embodiment of trace data to be acquired by an agent device at each node in a network system.

FIG. 6 shows an embodiment of trace data to be acquired by an agent device at each node in a network system. FIG. 6(a) shows arrangement of data to be acquired by an agent device in the present invention. FIG. 6(b) shows a part of the trace data arrangement shown in FIG. 6(a) in more detail. In the present invention, trace data is stored in a suitable recording medium, such as a hard disk, floppy (registered trademark) disk, a flash memory and an EEPROM, in a format appropriate for each node as shown in FIG. 6(a). Nodes can be identified in various methods. For example, it is possible to store an acquired data packet with a node identification value attached thereto. Alternatively, it is possible to register a data packet to a different storage area, such as a different directory and a folder, and attach an agent identification value, an identification value uniquely attached to the agent, to the data packet when the data packet is read by a processor to be described later, to use it as an identification value for subsequent processing. In addition to these, any method can be used only if nodes to be measured and data packets can be associated with each other. Furthermore, any value can be used as the node identification value or the agent identification value, and the value of g in the above-described expressions (3) and (4) can also be used.

Description will be now made on retrieval of a pair of packets and a method of sequencing nodes in the present invention, with the use of a specific embodiment of trace data.

(1) The Sameness of the Session of Data Packets

It is possible to identify whether or not the session of data packets are the same with the use of an identifier included in data packets as described above. For example, FIG. 6(b) shows an arrangement of a data packet extracted from trace data, for which a TCP session referred to as the three-way handshake is used. Any hexadecimal values are attached to a request packet issued from a client, such as syn=A8F989DC and ack=0. To a response packet from a server to the request packet corresponding to the request packet, the value of the syn included in the request packet plus 1 (one), that is, ack=A8F989DD is attached as the value of ack, and at the same time, any hexadecimal value such as syn=F39E5F3E, is attached as the value of syn.

On the other hand, to a response packet from the client, the value of syn of the response packet from the server plus 1 (one), that is, ack=F39E5F3F is attached as the value of ack. In this way, by checking the identifier for session management provided for each protocol in accordance with the specification of the protocol, a pair of packets belonging to the same session can be retrieved.

(2) Judgment of an Order Relation in a Transaction Direction Among Nodes

When a pair of packets is identified, the time stamp difference between appropriate data packets at a predetermined node identification value is calculated and, for example, a time difference $Dt_a$ at a first node is calculated. The same processing is performed for trace data specified by a different node identification value to calculate a second time difference $Dt_b$.

By comparing the calculated time differences $Dt_a$ and $Dt_b$, it is judged that a node with a larger time difference value is closer to the sending node and a node with a smaller time difference value is farther from the sending node, based on the judgment criteria shown in FIG. 5. That is, on the assumption that a node with a larger value to be the node g and a node with a smaller value to be the node (g+1), simultaneous inequalities can be created from the above expressions (3) and (4) for a given pair of packets. This processing can be performed for each node using its adjacent node. Alternatively, after performing the processing for nodes which are not adjacent to each other, the result can be stored as an order relation between adjoining nodes. This processing is required when the agent identification value in trace data does not necessarily indicate an order relation in a transaction direction for a predetermined data packets.

By performing the above-mentioned processing for all the acquired pairs of packets and nodes, the above-mentioned simultaneous inequalities can be generated. Data of the simultaneous inequalities, which include generated time stamp values as elements and the time difference $x_g$ as a variable, is then stored in a memory in a format suitable for numerical analysis, for example, an array data format. FIG. 7 shows a schematic pseudo-code of a program which can be implemented in a processor for processing for obtaining the specific time difference $x_g$ of the present invention.

(3) Pseudo-code of a Program Which Can Be Implemented for a Analysis Method of the Present Invention In the pseudo-code shown in FIG. 7, generated trace data is read from the network system first. After a pair of packets is stored and an order relation among nodes are judged, an order relation between adjoining nodes for the pair of packets is established. After that, the minimum and maximum values of time difference relative to the transaction direction are calculated and stored in a memory. The simultaneous inequalities shown as the expressions (4) are generated as array data including the $x_g$ as a variable and stored in a suitable memory. The stored array data can be solved with the use of any known solution engine and implemented with the use of a sweep-out method, for example. An allowable range of the quantity of time correction for a predetermined node can be given based on the obtained value of the time difference $x_g$, and the allowable range can be displayed using a graphical display, for example.

Figure 8:
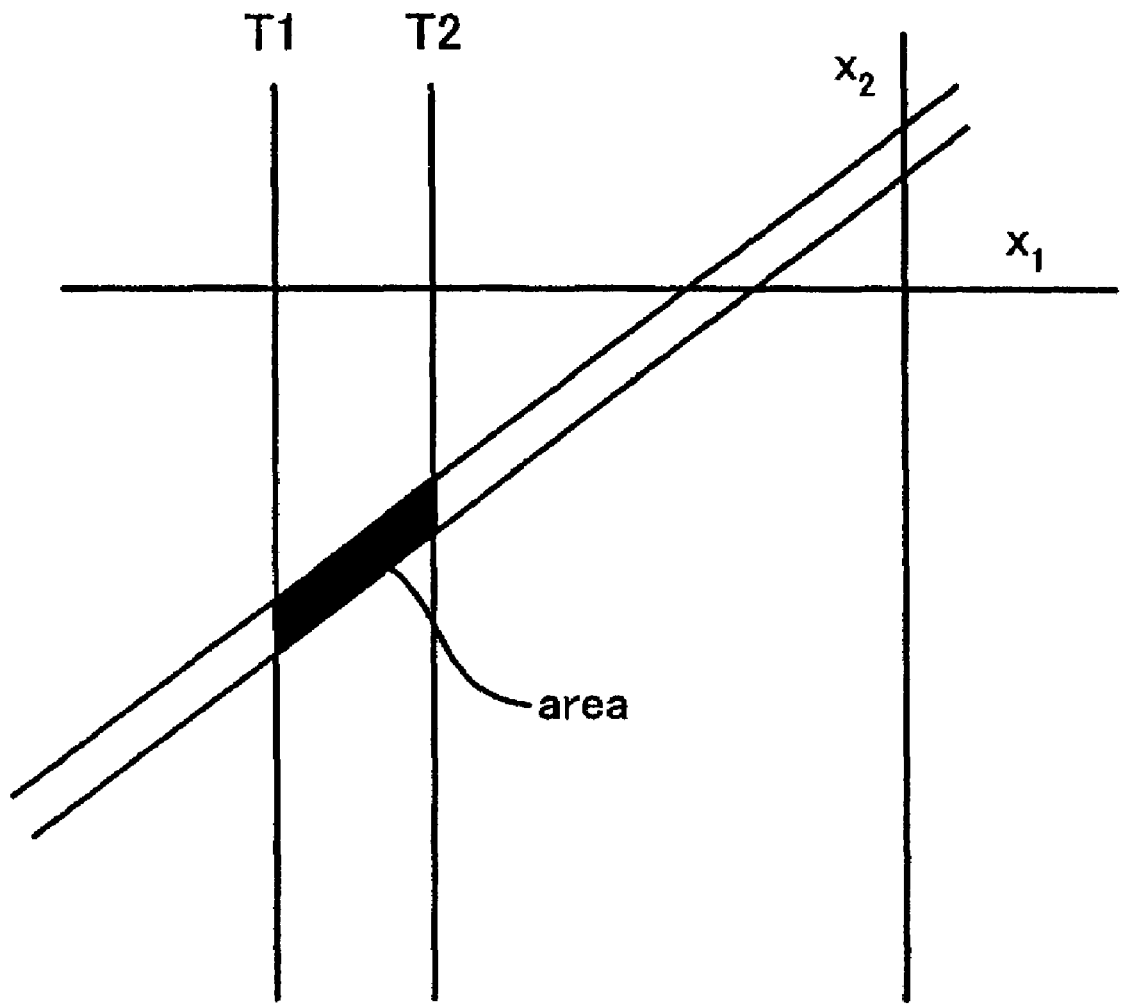
FIG. 8 shows an allowable range between the $x_1$ and the $x_2$ among specific time differences obtained by solving simultaneous inequalities given by the processing shown in FIG. 7.

FIG. 8 graphically shows the allowable range between the $x_1$ and the $x_2$ among specific time differences obtained by solving the simultaneous inequalities given by the processing shown in FIG. 7. In FIG. 8, the vertical axis shows the $x_2$ and the horizontal axis shows the $x_1$. The area indicating the allowable range between $x_1$ and $x_2$ is shown as a black area. In the embodiment shown in FIG. 8, it is indicated that the range between $T_1$ and $T_2$ is allowed for the $x_1$, and the $x_2$ satisfies the constraint condition in the area where the area of the range allowed for $x_1$ and the area between oblique lines are overlapped. In the present invention, instead of specifying absolute time axes, the value of the $x_g$ is specified as the correction quantity for specific time axes relatively to the network system 10 so that each specific time does not cause any significant system management inconvenience. Accordingly, the value of $x_2$ can be selected from the values in the area shown as an allowable range by a service engineer in consideration of other conditions to be taken into consideration or automatically selected with the use of a processor to be described later.

As a method for acquiring the quantity of time correction, it is possible to automatically calculate a value corresponding to the center in the allowable range and register the value as the quantity of time correction. In another embodiment, it is also possible to display the graph shown in FIG. 8 on a display device connected to a processor to be described later, specify a point within the allowable range with pointer means such as a mouse and a stylus pen, and acquire time corresponding to the location of the point to specify it the quantity of time correction.

Section II. A Processor for Executing Network Trace Analysis

Figure 9:
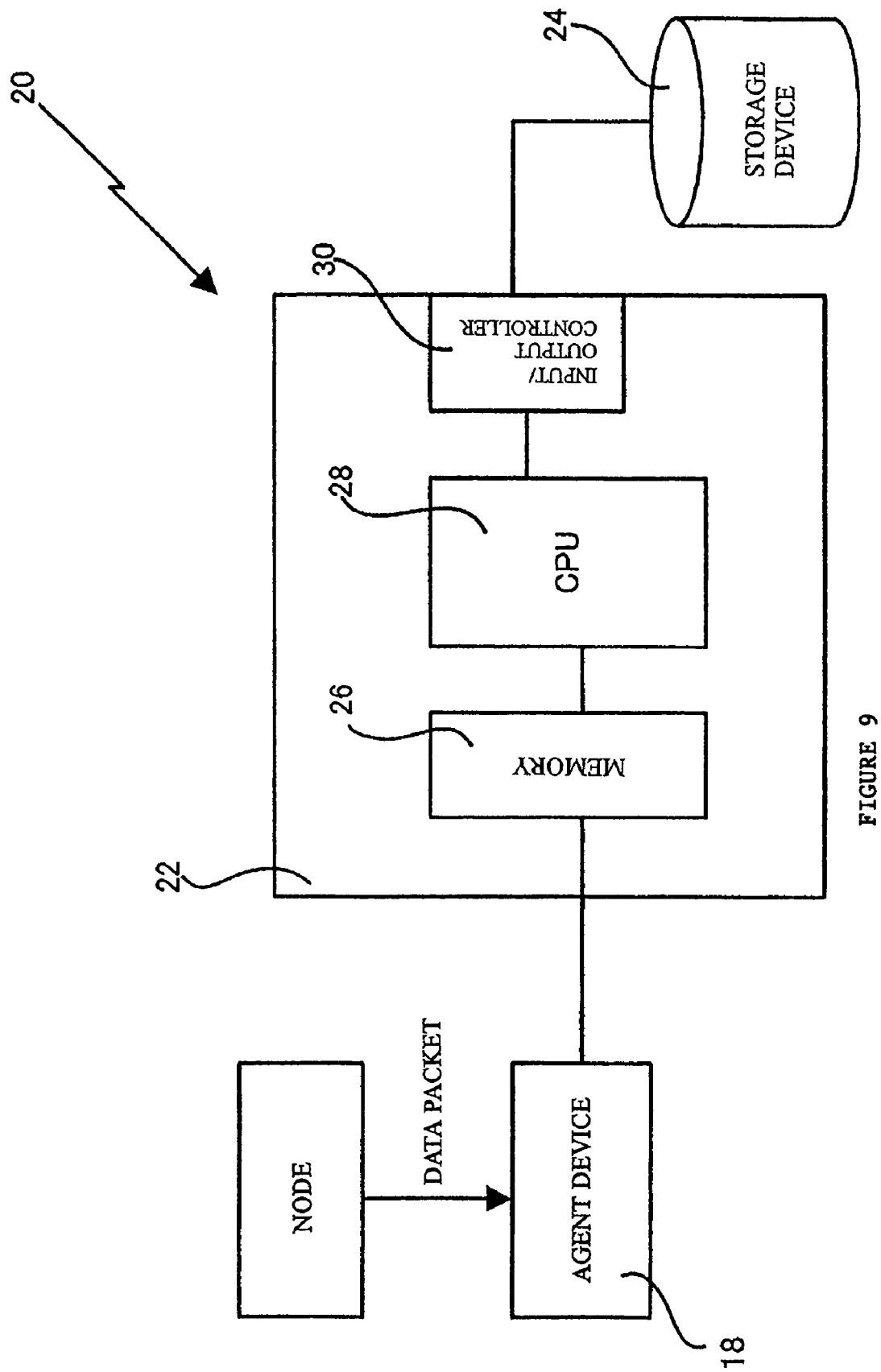
FIG. 9 shows an embodiment of a network analysis system for executing network trace analysis of the present invention.

FIG. 9 shows an embodiment of a network analysis system for executing network trace analysis of the present invention. A network analysis system 20 of the present invention comprises a processor 22 for executing analysis processing shown in FIG. 7 together with the agent device 18, and a storage device 24 for storing output results given by the processor 22. The agent device 18 is brought into a user site by a service engineer, for example, and connected to multiple nodes in a network system to monitor data packets. The monitored data packets are identified for each node and stored in a storage medium (not shown) provided for the agent device 18.

The processor 22 generally comprises a computer, such as a personal computer and a workstation, which is configured separately from the agent device 18. The processor 22 generally comprises a memory 26, a central processing unit (CPU) 28 and an input/output controller 30. The processor 22 reads data acquired by the agent device 18 and executes the time difference analysis processing described above. The quantity of time correction for time differences acquired by the time difference analysis processing is stored in the storage device 24 via the input/output controller 30 in association with each node. The stored data of the quantity of time correction is stored, for example, in a suitable recording medium included in the storage device 24 to be used as maintenance data for the network system.

Figure 10:
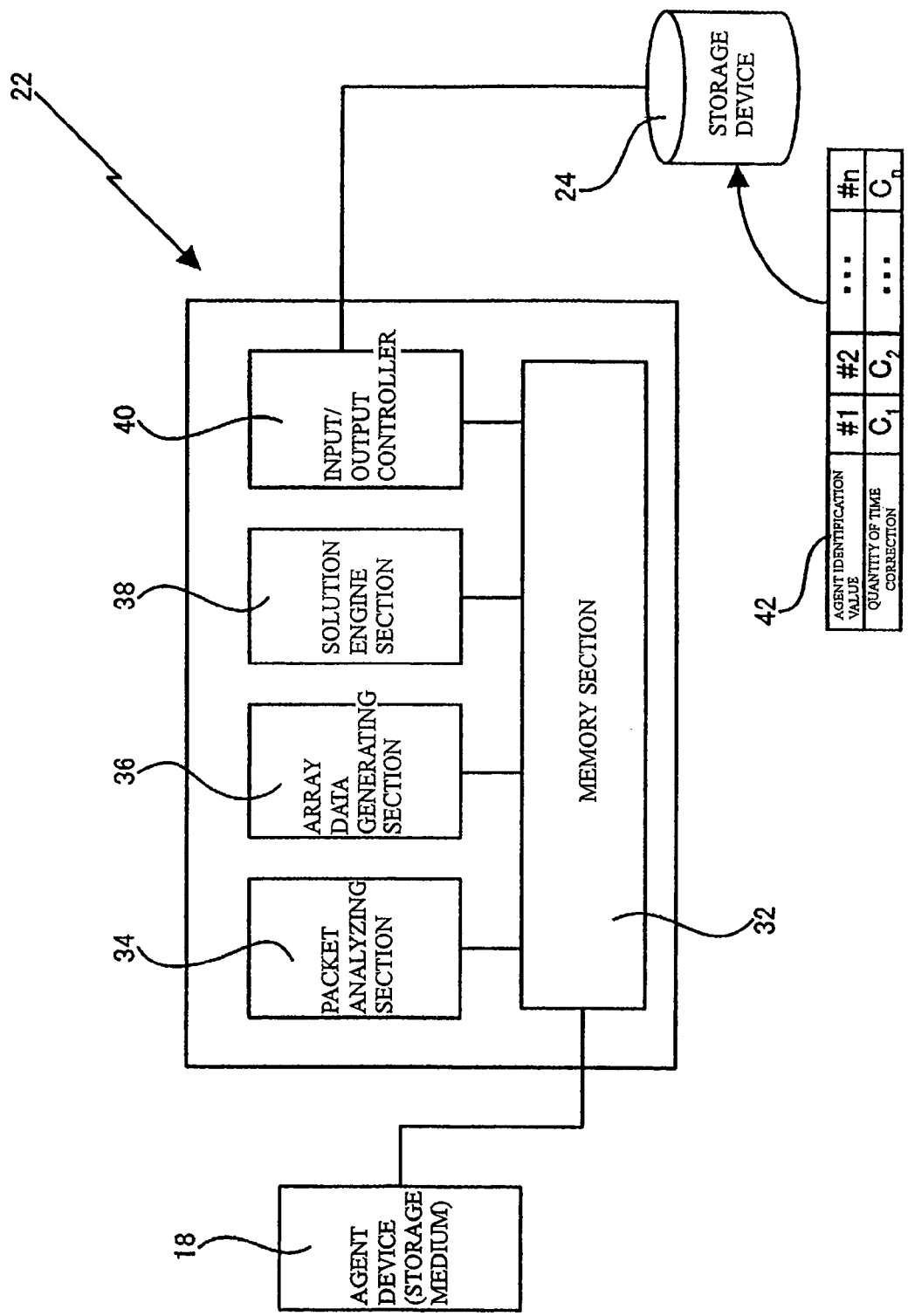
FIG. 10 shows a schematic functional block diagram of a processor of the present invention.

FIG. 10 shows a schematic functional block diagram of the processor 22 of the present invention. The processor 22 of the present invention comprises a memory section 32, a packet analyzing section 34, an array data generating section 36 and a solution engine section 38. Data read from the agent device 18 is stored in the memory section 32 until the data is called from a predetermined process. The packet analyzing section 34 reads data from the memory section 32 to retrieve a pair of packets, and generates an order relation among nodes to store it in an appropriate area in the memory section 32. The array data generating section 36 generates array data for obtaining simultaneous equations from the generated data of the pair of packets and stores them in the memory section 32.

In a particular embodiment of the present invention, the solution engine section 38 may be a software module including a program for simultaneous linear equations. The solution engine section 38 reads the stored array data, gives a solution to the simultaneous equations with a method such as a sweep out method, and executes processing for specifying an allowable range of the quantity of time correction from the solution. At the same time, the processor 22 stores the determined value of the quantity of time correction 42 in an appropriate recording medium provided for the storage device 24 located internal or external to the processor 22 via the input/output controller 40, for each agent identification value. The above-mentioned quantity of time correction obtained according to the present invention can be used for correction of time differences for nodes in a network system.

Figure 11:
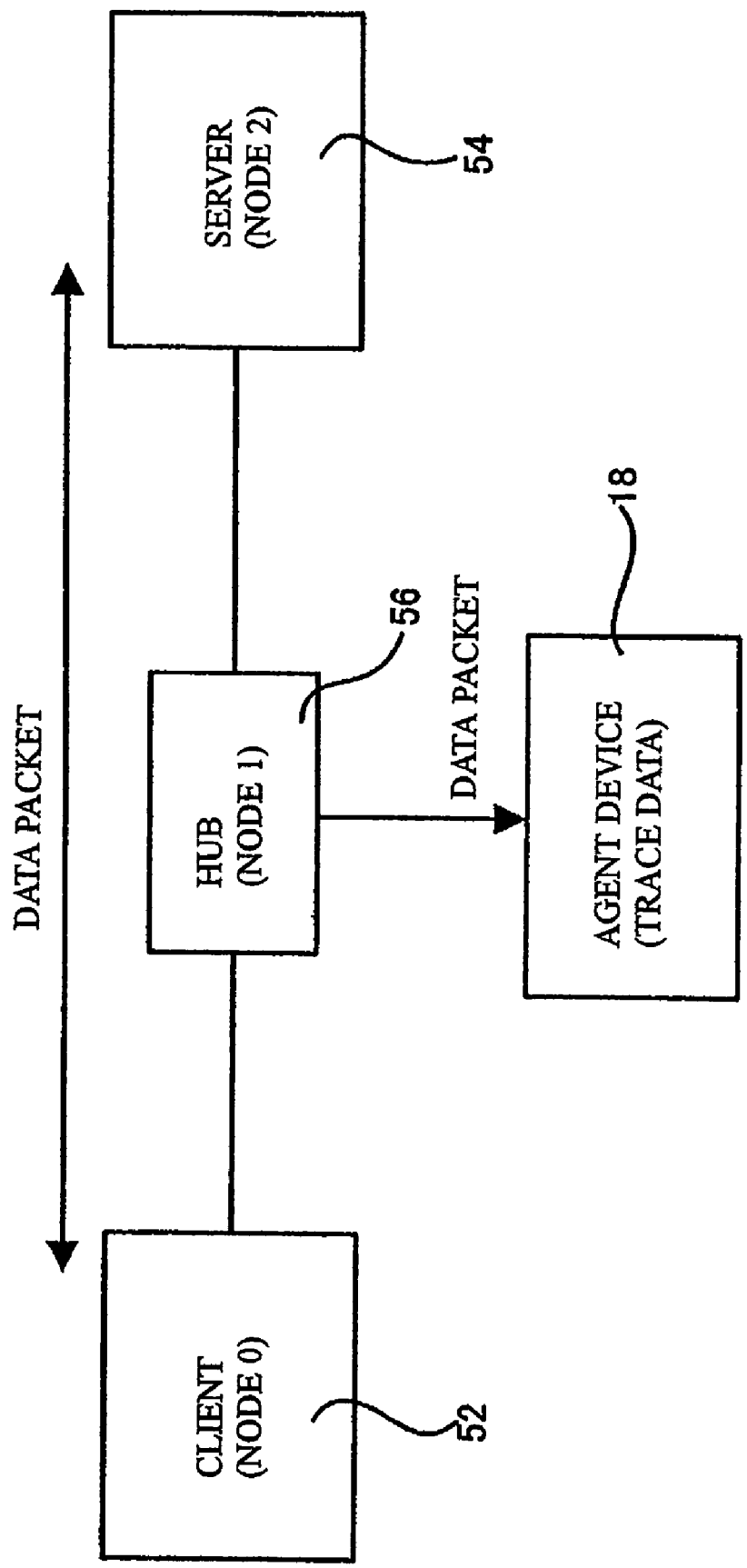
FIG. 11 shows an embodiment example of a network system used for an experiment.

The inventor et al. configured an actual network system to evaluate the effect of the present invention described above. FIG. 11 shows an embodiment example of a network system 50 used for the experiment. The network system 50 used for the experiment is a system comprising a client 52, a server 54 and a hub 56 connected between the client 52 and the server 54. In the experiment shown in FIG. 10, an agent device 18 was connected to the hub 56 to acquire data packets. The acquired data packets were stored in a hard disk and processed by the processor 22 to calculate the allowable range of the time difference $x_g$. An appropriate value was selected from the obtained allowable range of the time difference $x_g$ to perform time correction for the client 52, the server 54 and the hub 56.

Figure 12:
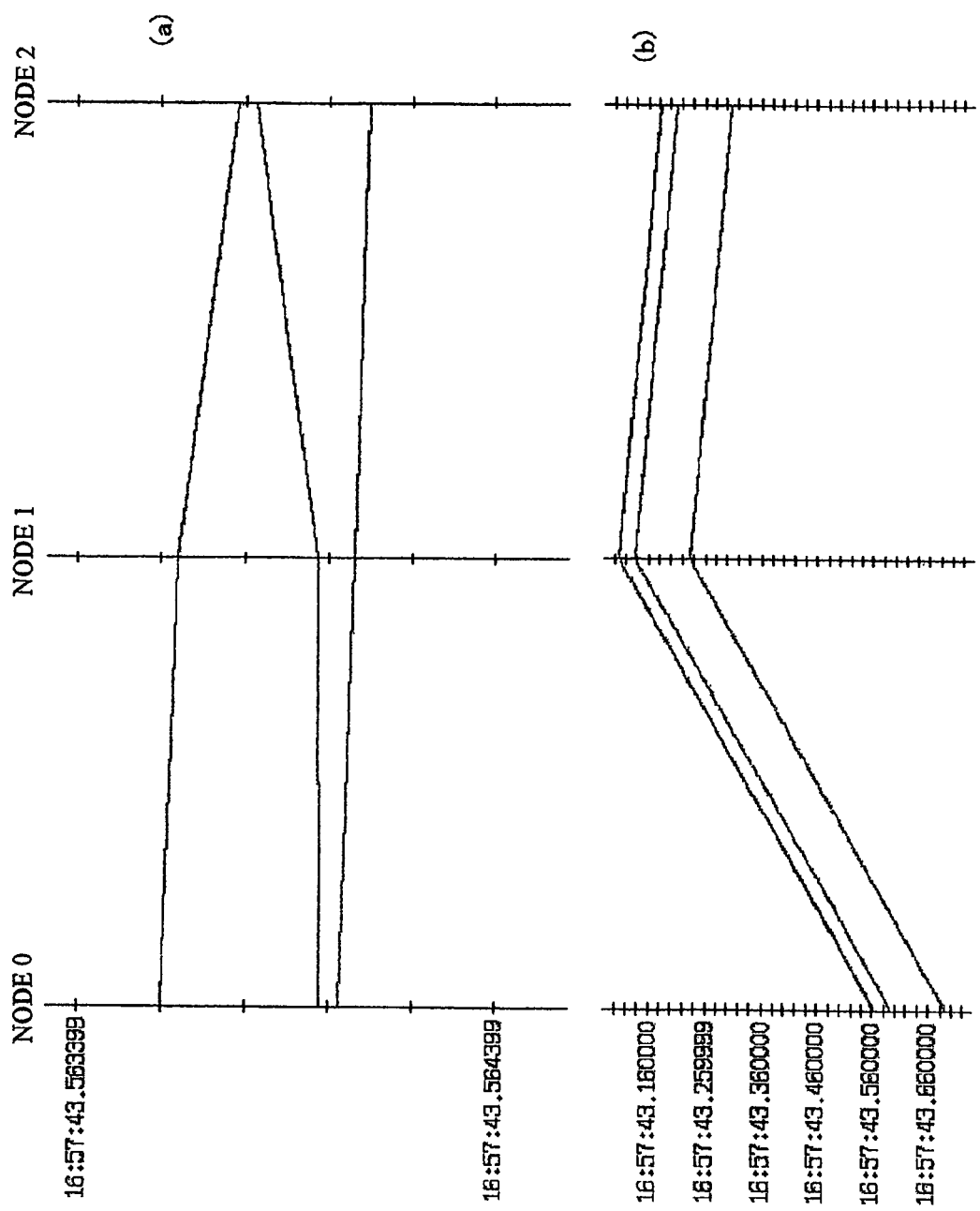
FIG. 12 shows a time chart in a network system, which has been corrected by a time correction method according to the present invention, and an uncorrected time chart for comparison.

FIG. 12 shows a time chart in the network system 50, which has been corrected by a time correction method according to the present invention and an uncorrected time chart for comparison. FIG. 12(a) is the time chart to which the present invention has been applied, and FIG. 12(b) is the time chart before correction. On the specific time axis of the client 52 (node 0) shown in FIG. 12, there are shown times obtained by the experiment. In FIG. 12, the reference time 0 of the specific time axes are shown to be aligned on the same line. As seen from FIG. 12(a), the time chart to which the time difference correction method of the present invention has been applied does not have a significant inconvenience such as reversal of times.

On the contrary, in the time chart before correction shown in FIG. 12(b), the data packet sent from the client 52 (node 0) passes the hub 56 (node 1) at a time in the past and is received by the server 54 (node 2) at a time in the past. At this point of time, if the server 54 includes an application for performing processing using a sending time and a receiving time, then there is caused an inconvenience such as stop or inability of the processing.

As shown in FIG. 12, according to a network trace analysis method of the present invention and a time correction method using the network trace analysis method, it is possible to correct time among apparatuses connected to a network system efficiently and with an objective measure. Therefore, according to the present invention, it is possible to improve efficiency of maintenance for a network system and significantly reduce labor required for work by a user or service engineer.

A network trace analysis method and a transaction direction analysis method of the present invention are realized by causing a computer to read a device-executable program for performing the above-mentioned methods and execute the program to configure each functional block described above.

The above-described computer-executable program according to the present invention can be written in any known programming language, and FORTRAN, C language, C++ language, Java[a] (registered trademark) and the like, for example, can be used as the above-described programming language.

The present invention has been described with the use of the particular embodiments shown in the figures. However, the present invention is not limited to the embodiments described above, and other various embodiments, deletion and addition can be applied by one skilled in the art, in addition to the embodiments disclosed in the present invention.

What is claimed is:

1. A time difference correction method for correcting time difference of specific time axes of nodes connected to a computer network, the method comprising:
   acquiring trace data at each node by analyzing time stamps of data packets transmitted via the computer network;
   determining from the trace data an order relation along a transaction direction among the nodes;
   generating a range of time difference of the specific time axes based on numerical analysis involving data with respect to the order relation, the generation step comprising creating array data for the purpose of representing and solving simultaneous linear inequalities; and
   selecting a time correction value from within the range of time difference.

2. The method according to claim 1, wherein time difference is included in the array data as a variable.

3. The method according to claim 1, wherein determining the order relation comprises determining which is the larger of differences between time stamps given when a pair of packets retrieved from the trace data and belonging to the same session pass two adjoining nodes.

4. The method according to claim 1, wherein determining the order relation comprises:
    reading the trace data;
    retrieving from the trace data a pair of packets belonging to the same session;
    reading time stamps given when the pair of packets pass each of a plurality of predetermined nodes;
    calculating a time stamp difference at each of the plurality of predetermined nodes based on the time stamps given at each of the plurality of predetermined nodes; and
    comparing the calculated time stamp differences.

5. The method according to claim 4, wherein determining the order relation further comprises assigning a node at which the time stamp difference is larger on the upstream of the transaction direction and a node at which the time stamp difference is smaller on the downstream of the transaction direction.

6. A time difference correction method for correcting time difference of specific time axes of nodes connected to a computer network, the method comprising:
    acquiring trace data at each node by analyzing time stamps of data packets transmitted via the computer network;
    determining from the trace data an order relation along a transaction direction among the nodes;
    generating simultaneous inequalities via the order relation;
    solving the simultaneous inequalities in order to obtain a range of time difference of the specific time axes; and
    selecting a time correction value from within the range of time difference.

7. The method according to claim 6, further comprising storing the simultaneous inequalities in memory in an array data format.

8. The method according to claim 6, wherein determining the order relation comprises determining which is the larger of differences between time stamps given when a pair of packets retrieved from the trace data and belonging to the same session pass two adjoining nodes.

9. The method according to claim 6, wherein determining the order relation comprises:
    reading the trace data;
    retrieving from the trace data a pair of packets belonging to the same session;
    reading time stamps given when the pair of packets pass each of a plurality of predetermined nodes;
    calculating a time stamp difference at each of the plurality of predetermined nodes based on the time stamps given at each of the plurality of predetermined nodes; and
    comparing the calculated time stamp differences.

10. The method according to claim 9, wherein determining the order relation further comprises assigning a node at which the time stamp difference is larger on the upstream of the transaction direction and a node at which the time stamp difference is smaller on the downstream of the transaction direction.

* * * * *

UNITED STATES PATENT AND TRADEMARK OFFICE
CERTIFICATE OF CORRECTION

PATENT NO. : 7,623,527 B2  Page 1 of 1
APPLICATION NO. : 10/879600
DATED : November 24, 2009
INVENTOR(S) : Mitani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

Twenty-sixth Day of October, 2010

David J. Kappos
*Director of the United States Patent and Trademark Office*